US010511642B1

(12) United States Patent
Wren et al.

(10) Patent No.: US 10,511,642 B1
(45) Date of Patent: *Dec. 17, 2019

(54) TOOLS FOR MICRO-COMMUNITIES

(71) Applicant: Google LLC, Mountain View, CA (US)

(72) Inventors: Christopher Wren, Arlington, MA (US); Nadav Aharony, Cambridge, MA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,407

(22) Filed: Sep. 11, 2015

Related U.S. Application Data

(63) Continuation of application No. 14/220,086, filed on Mar. 19, 2014, now Pat. No. 9,137,194, which is a continuation of application No. 13/198,569, filed on Aug. 4, 2011, now Pat. No. 8,694,593.

(60) Provisional application No. 61/470,427, filed on Mar. 31, 2011.

(51) Int. Cl.
*H04L 12/58* (2006.01)
*H04L 29/06* (2006.01)

(52) U.S. Cl.
CPC ............ *H04L 65/403* (2013.01); *H04L 51/32* (2013.01)

(58) Field of Classification Search
CPC ......... G06Q 50/10; G06Q 50/01; H04L 51/32
See application file for complete search history.

(56) References Cited

U.S. PATENT DOCUMENTS

| 6,130,938 A | 10/2000 | Erb |
| 6,192,119 B1 | 2/2001 | Wilson |
| 6,697,478 B1 | 2/2004 | Meldrum et al. |
| 6,754,322 B1 | 6/2004 | Bushnell |
| 7,106,848 B1 | 9/2006 | Barlow |
| 7,366,990 B2 | 4/2008 | Pitroda |
| 7,555,110 B2 | 6/2009 | Dolan et al. |
| 7,610,287 B1 | 10/2009 | Dean et al. |
| 7,742,468 B2 | 6/2010 | Vagelos |
| 8,375,034 B2 | 2/2013 | Norton et al. |

(Continued)

FOREIGN PATENT DOCUMENTS

WO WO0279984 10/2002

OTHER PUBLICATIONS

Kovach, Steve, "Flow to: Link Foursquare and GroupMe for Texting Nearby Friends", Business Insider, dated Feb. 18, 2011, 2 pages, http://www.businessinsider.com/how-to-send-a-text-to-your-foursquare-friends-using-groupme-2011-2.

(Continued)

*Primary Examiner* — Khaled M Kassim
*Assistant Examiner* — Syed S Ali
(74) *Attorney, Agent, or Firm* — Fish & Richardson P.C.

(57) ABSTRACT

A system and method for associating users with a micro-community that is relevant to an object reference. The object reference is anything that can be perceived either physically or conceptually, such as a location, a document, a calendar entry, a document, a news feed, a biometric key, an image, a news feed, etc. A micro-community engine identifies users who are associated explicitly with the object reference as well as people who would be interested in the object implicitly and associates them with a micro-community. The micro-community engine provides an intuitive and flexible means for communication between members of the micro-community.

18 Claims, 8 Drawing Sheets

(56) References Cited

U.S. PATENT DOCUMENTS

| | | | |
|---|---|---|---|
| 9,729,352 B1* | 8/2017 | Stoler et al. | H04L 12/588 |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2007/0250901 A1 | 10/2007 | McIntire et al. | |
| 2008/0056475 A1 | 3/2008 | Brannick et al. | |
| 2008/0192656 A1 | 8/2008 | Vagelos | |
| 2008/0282324 A1 | 11/2008 | Hoal | |
| 2009/0080635 A1 | 3/2009 | Altberg et al. | |
| 2009/0152349 A1 | 6/2009 | Bonev et al. | |
| 2009/0157693 A1 | 6/2009 | Palahnuk | |
| 2009/0327054 A1 | 12/2009 | Yao et al. | |
| 2010/0036912 A1* | 2/2010 | Rao | H04L 51/20 709/204 |
| 2010/0088753 A1 | 4/2010 | Ayres et al. | |
| 2010/0146443 A1* | 6/2010 | Zuckerberg | H04L 67/306 715/810 |
| 2010/0232431 A1* | 9/2010 | Sebastian | H04N 7/17318 370/390 |
| 2011/0055249 A1 | 3/2011 | Consuegra et al. | |
| 2011/0055393 A1* | 3/2011 | Akabane | G06Q 10/10 709/225 |
| 2011/0098156 A1 | 4/2011 | Ng et al. | |
| 2011/0225054 A1* | 9/2011 | Morris | G06Q 30/02 705/14.73 |
| 2011/0227699 A1 | 9/2011 | Seth | |
| 2011/0231276 A1 | 9/2011 | Yeap et al. | |
| 2011/0238755 A1 | 9/2011 | Khan et al. | |
| 2011/0238761 A1 | 9/2011 | Mizokami | |
| 2011/0239137 A1* | 9/2011 | Bill | G06F 17/30749 715/757 |
| 2011/0307549 A1* | 12/2011 | Motsinger | G06Q 10/00 709/203 |
| 2011/0314115 A1 | 12/2011 | Nagaraj | |
| 2011/0320715 A1 | 12/2011 | Ickman et al. | |
| 2012/0036444 A1 | 2/2012 | Andersen | |
| 2012/0101985 A1* | 4/2012 | Kemp | G06F 17/3051 707/609 |
| 2012/0102064 A1* | 4/2012 | Becker | G06Q 30/00 707/769 |
| 2012/0102114 A1 | 4/2012 | Dunn et al. | |
| 2012/0110052 A1* | 5/2012 | Smarr | H04W 4/21 709/201 |
| 2012/0110085 A1* | 5/2012 | Malik | G06Q 10/00 709/205 |
| 2012/0142411 A1* | 6/2012 | Thompson | G07F 17/326 463/25 |
| 2012/0142429 A1 | 6/2012 | Muller | |
| 2012/0173625 A1 | 7/2012 | Berger | |
| 2012/0209677 A1 | 8/2012 | Mehta et al. | |
| 2012/0239479 A1 | 9/2012 | Amaro et al. | |
| 2013/0013489 A1 | 1/2013 | Kremen et al. | |
| 2013/0013695 A1 | 1/2013 | Jin et al. | |
| 2013/0080927 A1* | 3/2013 | Weaver | G06Q 10/10 715/758 |
| 2013/0151608 A1* | 6/2013 | Wiseman | H04L 51/04 709/204 |
| 2013/0205225 A1 | 8/2013 | Deng et al. | |
| 2013/0238727 A1 | 9/2013 | Martinez et al. | |
| 2013/0246261 A1* | 9/2013 | Purves | G06Q 20/105 705/41 |
| 2013/0254397 A1* | 9/2013 | Lai | H04L 51/32 709/225 |
| 2013/0289972 A1 | 10/2013 | Wong et al. | |
| 2013/0290431 A1 | 10/2013 | Armstrong et al. | |
| 2013/0325982 A1* | 12/2013 | Krantz | H04L 51/04 709/206 |
| 2014/0074591 A1 | 3/2014 | Allen et al. | |
| 2014/0164396 A1* | 6/2014 | Becker | G06Q 30/00 707/748 |
| 2014/0278754 A1* | 9/2014 | Cronin | G06F 17/30539 705/7.29 |
| 2015/0039696 A1* | 2/2015 | Appelman | G06Q 10/10 709/204 |
| 2015/0163258 A1* | 6/2015 | Garcia, III | H04L 67/24 709/204 |
| 2015/0216413 A1* | 8/2015 | Soyao | A61B 5/0022 709/204 |
| 2017/0134479 A1* | 5/2017 | Kalgi | H04L 67/10 |
| 2017/0200174 A1* | 7/2017 | Martinez | G06Q 30/0201 |
| 2017/0200182 A1* | 7/2017 | Delort | G06Q 30/0226 |

OTHER PUBLICATIONS

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Krkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

(56) References Cited

OTHER PUBLICATIONS

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

TOOLS FOR MICRO-COMMUNITIES

CROSS REFERENCE TO RELATED APPLICATIONS

This application is a continuation of, and claims priority to U.S. patent application Ser. No. 14/220,086, filed Mar. 19, 2014, titled "Tools for Micro-Communities", which is a continuation of, and claims priority to U.S. patent application Ser. No. 13/198,569, filed Aug. 4, 2011, titled "Tools for Micro-Communities," which claims priority under 35 USC §119(e) to U.S. Application No. 61/470,427, entitled "Tools for Micro-Communities" filed Mar. 31, 2011, the entirety of which is herein incorporated by reference.

BACKGROUND

The specification relates to a system and method for generating micro-communities and identifying users to associate with the micro-community. In particular, the specification relates to identifying or generating micro-communities, identifying users that are associated with the micro-communities and suggesting unassociated users that are interested in the micro-community.

With the advent of social networking services it has become increasingly popular to share Internet content or any information in general. For example, users email links, post content to a social networking website, transmit short messages to a list of subscribers, etc. Currently, sharing of such information is either public to the world or manually restricted to a specific set of users. If a user wants to create a group for sharing information, the subject matter of the group is defined by the creator and the members are manually added.

Current methods of communicating with multiple users lack an intuitive and flexible way of grouping users based on a shared context. For example, a user can email all attendees of an event associated with a calendar entry, but email is not the desired form of communication since it is not optimal for generating ongoing discussions related to the meeting. Similarly, users can initiate a chat but the content of the chat cannot be extracted and used in a different social context.

SUMMARY OF THE INVENTION

In some examples the specification overcomes the deficiencies and limitations of the prior art at least in part by providing system and method for associating users with a micro-community relating to an object reference. The object reference includes anything that can be perceived either physically or conceptually, such as a location, a calendar entry, a document, a news feed, a biometric key, a reference to a barcode, food, an image, a website, a person or a group, etc. In another embodiment, the object reference is a topic or subject matter that users want to discuss.

In one embodiment, a micro-community engine includes an object type parser, an object type dispatcher, an account reference fetcher, a micro-community type dispatcher, a micro-community fetcher, an ID converter module, a ratings server and a notification module. The account reference fetcher identifies users or account references that are relevant to an object reference. The account reference includes a reference to an email account, a reference to a social network account, an identity of at least one of the users or an identity of a device. Identifying users who are relevant includes both people who are associated explicitly with the object reference as well as people who are implicitly interested in the object reference. The account reference fetcher generates account references of users that would find the object reference interesting based at least in part on a preference of the users, activities on a social network, an interaction of the users with a webpage and a heterogeneous data source. Interaction of the users with a webpage includes at least one of providing a preference of the users, an interest of the users, a comment, a tag and a search.

The account reference engine associates the users that were identified as being implicitly interested in the object reference upon receiving an approval from the users. The users' approval is obtained by, for example, the notification module sending an invitation to join the micro-community. In one embodiment, the micro-community fetcher retrieves existing micro-communities, including communities manifested as subscription groups that are relevant to an object reference or a user. In another embodiment, the micro-community fetcher creates a micro-community based on an object reference and associates the identified users with the micro-community.

The micro-community engine provides an intuitive and flexible method for facilitating communication between members of the micro-community. For example, the notification module emails all attendees of the calendar entry or automatically creates a threaded discussion that is private to all attendees of the meeting.

In one embodiment, the specification describes a computer-implemented method of associating users with a micro-community comprising receiving an input, the input including an object reference, an account fetcher generating a list of account references being associated with at least one of the users and a micro-community fetcher determining whether the micro-community exists, the micro-community being relevant to the object reference. An object type parser generates a parsed object reference. In one embodiment, the input is a search query and a search engine converts the search query to an object reference. If a micro-community exists, the notification module transmits a notification of the micro-community to the list of account references. In addition, the micro-community fetcher determines whether all account references are associated with the micro-community and the notification module transmits an invitation to join the micro-community to any unassociated account reference. If there is no existing micro-community, the micro-community fetcher creates a micro-community that is relevant to the object reference, the micro-community including the list of account references.

In one embodiment, the specification describes a computer program product comprising a computer useable medium including a computer readable program, wherein the computer readable program when executed on a computer causes the computer to perform steps.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
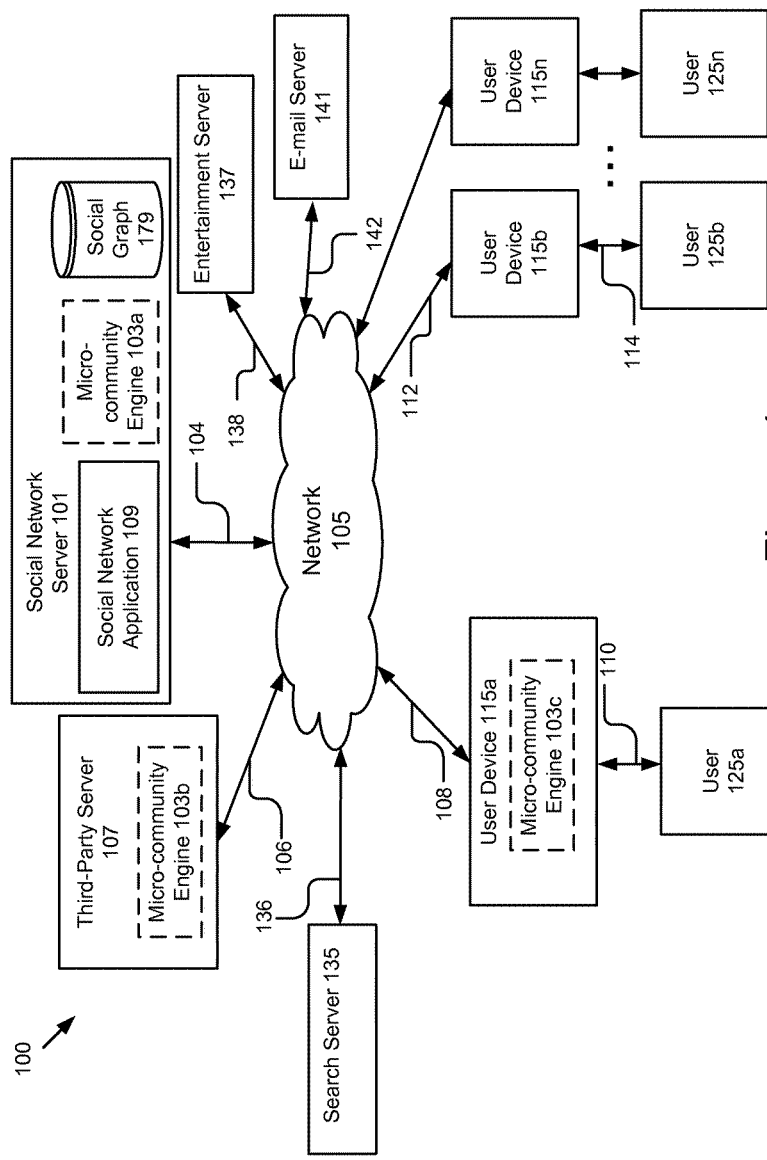
FIG. 1 is a block diagram illustrating one embodiment of a system for associating users with a micro-community.

A system and method for associating users with a micro-community related to an object or topic is described below. In the following description, for purposes of explanation, numerous specific details are set forth in order to provide a thorough understanding of the specification. It will be apparent, however, to one skilled in the art that the technology described in the embodiments can be practiced without these specific details. In other instances, structures and devices are shown in block diagram form in order to avoid obscuring the specification. The specification applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some example embodiments can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, some example embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems appears from the description below. In addition, the specification is not described with reference to any particular programming language. It will be appreciated that a variety of programming languages may be used to implement the teachings of the specification as described herein.

System Overview

FIG. 1 illustrates a block diagram of a system 100 for associating users with a micro-community according to one embodiment. The illustrated system 100 associates users with a micro-community including user devices 115a, 115b that are accessed by users 125a, 125b, a social network server 101, a third-party server 107 and a search server 135. In the illustrated embodiment, these entities are communicatively coupled via a network 105. Although only two user devices are illustrated, persons of ordinary skill in the art will recognize that any number of user devices 115n is available to any number of users 125n.

The user devices 115a, 115b in FIG. 1 are used by way of example. While FIG. 1 illustrates two devices, the embodiment applies to any system architecture having one or more user devices. Furthermore, while only one network 105 is coupled to the user devices, 115a, 115b, the social network server 101, the third-party server 107 and the search server 135, in practice any number of networks 105 can be connected to the entities. Furthermore, while only one third-party server 107 is shown, the system 100 could include one or more third-party servers 107.

In one embodiment, the micro-community engine 103a is operable on the social network server 101, which is coupled to the network via signal line 104. The social network server 101 also contains a social network application 109 and a social graph 179. Although only one social network server 101 is shown, persons of ordinary skill in the art will recognize that multiple servers may be present. A social network is any type of social structure where the users are connected by a common feature, for example, Orkut. The common feature includes friendship, family, work, an interest, etc. The common features are provided by one or more social networking systems, such as those included in the system 100, including explicitly-defined relationships and relationships implied by social connections with other online users, where the relationships form a social graph 179. In some examples, the social graph 179 can reflect a mapping of these users and how they are related.

In another embodiment, the micro-community engine 103b is stored on a third-party server 107, which is connected to the network via signal line 106. In yet another embodiment, the micro-community engine 103c is stored on a user device 115a, which is connected to the network via signal line 108. The user 125a interacts with the user device 115a via signal line 110. Similarly, the user device 115b is coupled to the network 105 via signal line 112 and the user 125b interacts with the user device 115b via signal line 114. Persons of ordinary skill in the art will recognize that the micro-community engine 103 can be stored in any combination on the devices and servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The micro-community engine 103 receives data for identifying users associated with a micro-community from heterogeneous data sources. The micro-community engine 103, in one embodiment, receives data from a third-party server 107, a social network server 101, user devices 115a, 115b . . . 115n, a search server 135, an entertainment server 137 that is coupled to the network 105 via signal line 138, an email server 141 that is coupled to the network 105 via signal line 142 and a social graph 179. The entertainment server 137 provides information about object references, such as social activities.

In one embodiment, the search server 135 receives open text or parameterized search terms from a user device 115a, a third-party server 107 or a social network server 101. The search server 135 retrieves object references that match the open text or parameterized search terms, such as a webpage, and transmits the results to the requestor via signal line 136.

Micro-Community Engine 103

Figure 2A:
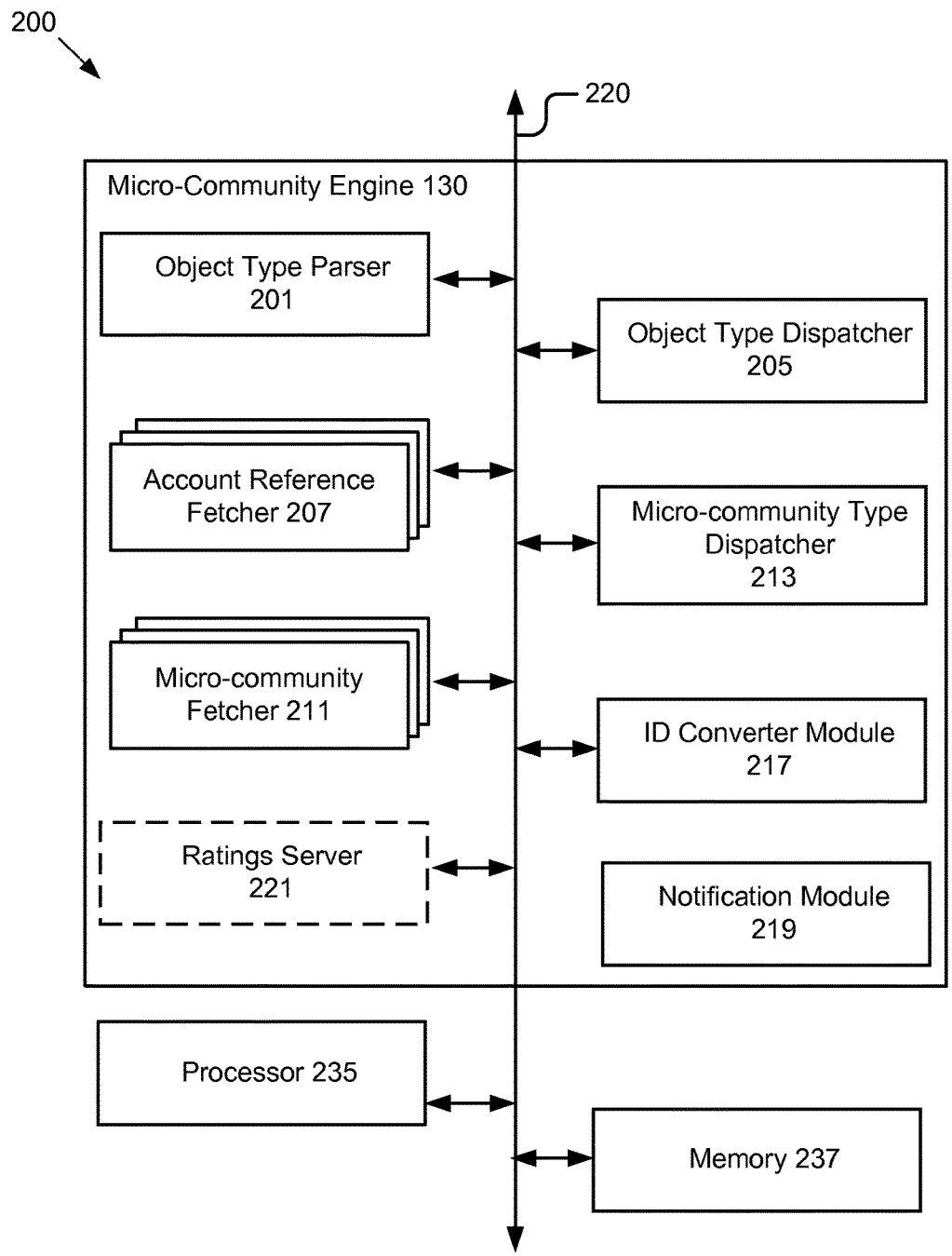
FIG. 2A is a block diagram illustrating one embodiment of a micro-community engine.

Referring now to FIG. 2A, the micro-community engine 103 is shown in more detail. FIG. 2A is a block diagram of a computing device 200 that includes the micro-community engine 103, a memory 237 and a processor 235 that are coupled to the bus 220. In one embodiment, the computing 200 device is a social network server 101. In another embodiment, the computing device 200 is a third-party server 107. In yet another embodiment, the computing device 200 is a user device 115a.

The processor 235 comprises an arithmetic logic unit, a microprocessor, a general purpose controller or some other processor array to perform computations and provide electronic display signals to a display device. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via the bus 220. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

In one embodiment, the micro-community engine 103 comprises an object type parser 201, an object type dispatcher 205, an account reference fetcher 207, a micro-community type dispatcher 213, a micro-community fetcher 211, an identity (ID) converter module 217, optionally a ratings server 221 and a notification module 219.

The object type parser 201 is software including routines for receiving and parsing an object reference. The object reference includes anything that can be perceived either physically or conceptually, such as a location, a calendar entry, a document, a news feed, a biometric key, food, an image, a news feed, a website, a person or a group, etc. In another embodiment, the object reference is a topic or subject matter that users want to discuss. In one embodiment, the object type parser 201 is a set of instructions executable by the processor 235 to provide the functionality described below for parsing the object reference. In another embodiment, the object type parser 201 is stored in the memory 237 of the computing device 200 and is accessible and executable by the processor 235. In either embodiment, the object type parser 201 is adapted for cooperation and communication with the processor 235, the object type dispatcher 205, the micro-community type dispatcher 213, the notification module 219 and other components of the computing device 200 via the bus 220.

The object type parser 201 receives an object reference that is a pointer or a Uniform Resource Identifier (URI) of a calendar entry item, a reference to a geographical location (such as Global Positioning System (GPS) coordinates, a mapping services such as Google Maps, a pointer indicating a location for example company headquarters, etc.), a reference to a conceptual or a categorical location (such as a Chinese restaurant, home, work, etc.), a pointer or a URI to a document or a spreadsheet or an image, a reference to a topic (such as a trending topic in public blog posts), a reference to a news feed, a reference to a biometric key or a barcode, a reference to a person or a group (such as a close family member, a movie star, a band or an organization), a Uniform Resource Locator (URL) or any other way to describe or refer to an object, physical or conceptual, known to a person with ordinary skill in the art.

In one embodiment, the object type parser 201 receives at least one of the object references mentioned above, parses the object reference and confirms that it is a known object reference type. If the object reference is not a known object reference type, the object type parser 201 performs additional steps. For example, the object type parser 201 transmits the object reference to the search server 135, which runs the object reference through a search engine to obtain additional identifying information about the object reference. In another embodiment, the object type parser 201 transmits a request for additional information to the notification module 219, which notifies a user that additional information is needed.

The object type parser 201 confirms that the received object reference contains all the required information for identifying users and micro-communities and transmits the parsed object reference to the object type dispatcher 205 and the micro-community type dispatcher 213.

The object type dispatcher 205 is software including routines for receiving the parsed object reference from the object type parser 201 and identifying an account reference fetcher 207 based on the type of object reference. For example, the account reference fetcher 207 is either an explicit or implicit account reference fetcher. In one embodiment the same account reference fetcher 207 employs either an explicit or an implicit algorithm for retrieving account references. In one embodiment, the object type dispatcher 205 is a set of instructions executable by the processor 235 for identifying an account reference fetcher 207. In another embodiment, the object type dispatcher 205 is stored in memory 237 of the computing device and is accessible and executable by the processor 235. In either embodiment, the object type dispatcher 205 is adapted for cooperation and communication with the processor 235, the object type parser 205, the account reference fetcher 207 and other components of the computing device 200 via the bus 220.

The account reference fetcher 207 is software including routines for identifying users or account references. In one embodiment, the account reference fetcher 207 is a set of instructions executable by the processor 235 to provide the functionality described below for identifying users or account references. In another embodiment, the account reference fetcher 207 is stored in memory 237 of the computing device and is accessible and executable by the processor 235. In either embodiment, the account reference fetcher 207 is adapted for cooperation and communication with the processor 235, the object type dispatcher 205, the notification module 219 and other components of the computing device 200 via the bus 220.

An account reference represents an account belonging to a person, a group or any other entity (such as a company, a restaurant, a musical band, etc.). A person of ordinary skill in the art will recognize that the most common scenario is that of accounts belonging to people, and hence the terms account, user and person are used interchangeably throughout the description, without taking away from the broader definition of an account.

An account reference could be an e-mail address, an internal system identifier of a person or an account (such as an employer ID within a company), an account holder's name, an identifier of a hardware device in possession of the account holder (such as a Bluetooth MAC address of a user's phone), a photograph of the account holder, a drawing, symbol, image, a barcode that identifies a user, a URI associated with a user or any other way to describe or refer to a person or an account known to one with ordinary skill in the art.

The account reference fetcher 207 identifies account references that are relevant to the object reference. In one embodiment, the account reference fetcher 207 identifies accounts of people that are explicitly associated with the object reference. In another embodiment, the account reference fetcher 207 identifies accounts of people that are implicitly associated with the object reference. The account reference fetcher 207 is described in further detail below with reference to FIG. 2B.

The micro-community type dispatcher 213 is software including routines for identifying a specific micro-community fetcher 211. In one embodiment, the micro-community type dispatcher 213 is a set of instructions executable by the processor 235 for receiving a parsed object reference from the object type parser 201 and for identifying a micro-community fetcher 211. In another embodiment, the micro-community type dispatcher 213 is stored in memory 237 of the computing device and is accessible and executable by the processor 235. In either embodiment, the micro-community type dispatcher 213 is adapted for cooperation and communication with the processor 235, the object type parser 201, the micro-community fetcher 211 and other components of the computing device 200 via the bus 220.

The micro-community dispatcher type 213 determines the most appropriate micro-community fetcher depending on the input it receives. The input to the micro-community dispatcher type 213 could be at least one of a parsed object reference, account references generated by the account reference fetcher 207 or a user generated list of account references. In one embodiment, the desired type of micro-community can either be pre-configured or the micro-community type dispatcher 213 can identify the desired type of micro-community by determining a relationship between the received account references.

The micro-community fetcher 211 is software including routines for retrieving or creating micro-communities. In one embodiment, the micro-community fetcher 211 is a set of instructions executable by the processor 235 to provide the functionality described below for identifying or creating micro-communities. In another embodiment, the micro-community fetcher 211 is stored in memory 237 of the computing device and is accessible and executable by the processor 235. In either embodiment, micro-community fetcher 211 is adapted for cooperation and communication with the processor 235, the micro-community type dispatcher 213, the ID converter module 217, the notification module 219 and other components of the computing device 200 via signal line 226.

A micro-community is a rendezvous point for a group of people or account users who are unified by any of the object references listed above. A micro-community includes features, functionalities or mechanisms for generating a group (such as a social network group, a social circle, a social network community, etc.), an e-mail or a mailing list (including a text message such as through a short-messaging service (SMS), an activity stream thread (such as a microblogging topic, a topic thread in a forum, a blog, etc.), a chat room, an audio/video conference call (such as a voice over internet protocol (VoIP) or instant messaging server), a social arena (such as an online multi-player game, virtual job fair, etc.), a group supported by a third-party service or any other way to group people together known to one with ordinary skill.

In one embodiment, the micro-community is permanent and can be re-used multiple times until a user deletes it. In another embodiment, the micro-community is fleeting or one-time such as an e-mail message that is constrained by time or location such as a live chat room that lasts for a day or until an event is over.

In one embodiment, the micro-community is public to the world. In another embodiment, the micro-community is visible publicly, i.e., the micro-community is searchable with a search engine, but the members and conversations are private. In yet another embodiment, the micro-community is private and visible exclusively to the members of the micro-community. In another embodiment, the members are private but they can broadcast and communicate with other members in a pre-determined area. For example, a user enters a coffee show and sends a broadcast message to all other members that are within the coffee shop.

The members of the micro-communities are assigned varied permission settings. For example, only the administrator is authorized to add members to the micro-community, only privileged members are allowed to comment, etc. In one embodiment, all members of a micro-community are designated administrators. The settings of the micro-community are set during the creation of a micro-community and can be varied at any time during its existence. In another embodiment, a member can change his settings to become invisible or unsubscribe from the micro-community.

According to one embodiment, the micro-community fetcher 211 receives a parsed object reference and retrieves an existing micro-community relevant to the parsed object reference. The micro-community fetcher 211 is similar to the account reference fetcher 207 in that it retrieves micro-communities that are explicitly associated with the object reference as well as micro-communities that are implicitly associated with the object reference, i.e. micro-communities that the user would find interesting. In one embodiment, the account reference fetcher 207 determines that a user would find the micro-community interesting based at least in part on at least one of a preference of the users, activities on a social network, an interaction of the users with a webpage and a heterogeneous data source. The micro-community fetcher 211 identifies the existence of a micro-community by searching for micro-communities that use the same words as the object reference. For example, the object reference is a webpage about Chinese restaurants in Cambridge, Mass. The micro-community fetcher 211 searches mailing lists, groups, threads, emails, etc. that discuss Chinese restaurants in Cambridge, Mass.

In another embodiment, the micro-community fetcher 211 retrieves an existing micro-community relevant to the object reference and further associates the account references identified by the account reference fetcher 207 with the retrieved micro-community (subject to user consent). In a further embodiment, the micro-community fetcher 211 sends out an invitation to join the micro-community to users that are not explicitly associated, but have been identified being interested in the micro-community. The micro-community fetcher 211 associates these users with the retrieved micro-community upon receiving an approval in response to the invitation.

In one embodiment, the micro-community fetcher 211 creates a micro-community relevant to the type of object reference received. Using the example above, if the micro-community fetcher 211 does not identify an existing micro-community about Chinese restaurants in Cambridge, Mass., the micro-community fetcher 211 generates a mailing list, a group, an activity stream thread, an email, etc. For example, the micro-community fetcher 211 generates a group in a social network by creating a group, a mailing list, an email, etc. titled "Chinese restaurants in Cambridge, Mass."

The micro-community fetcher 211 then populates the created micro-community with the generated account references (subject to user consent) or the notification module 219 transmits an invitation to the account references. A person of ordinary skill in the art will recognize that the account references can be pre-configured or manually inputted to the micro-community engine 130. A person with ordinary skill in the art will also recognize that the micro-community fetcher 211 retrieves and/or creates not just one, but a plurality of micro-communities relevant to the object reference and/or account references. The micro-community fetcher 211 is described in further detail with reference to FIG. 2B.

In one embodiment the computing device 200 includes an ID converter module 217, which is software including routines for converting the account type of an account/user to a type that is compatible with the micro-community. In one embodiment, the ID converter module 217 is a set of instructions executable by the processor 235 to provide the functionality described below for converting the account type of an account/user. In another embodiment, the ID converter module 217 is stored in memory 237 of the computing device 200 and is accessible and executable by the processor 235. In either embodiment, the ID converter module 217 is adapted for cooperation and communication with the processor 235, the micro-community fetcher 211 and other components of the computing device 200 via the bus 220.

The ID converter module 217 receives an account reference from the micro-community fetcher 211 for an incompatible format. The ID converter module 217 converts the account references identified by the account reference fetcher 207 to a type that is compatible and appropriate for the micro-community. For example, if an account reference identified by the account reference fetcher 207 is an internal employee ID of the company, the ID converter module 217 retrieves an email address of the employee so that the micro-community fetcher 211 has information for associating the email address with the mailing list (micro-community). In another embodiment, the ID converter module 217 creates a compatible account type in the event that an appropriate account type fails to exist.

In one embodiment the computing device 200 also includes a ratings server 221 that is software including routines for rating the generated account references/micro-communities. In one embodiment, the ratings server 221 is a set of instructions executable by the processor 235 to provide the functionality described below for rating the generated account references/micro-communities. In another embodiment, the ratings server 221 is stored in memory 237 of the computing device 200 and is accessible and executable by the processor 235. In either embodiment, the ratings server 221 is adapted for cooperation and communication with the processor 235, the account reference fetcher 207, the micro-community fetcher 211, the notification module 219 and other components of the computing device 200 via the bus 220.

The rating server 220 rates the generated account references/micro-communities in relation to their relevance to the object reference. In one embodiment, the rating score of the account references generated by the ratings server 221 is used by the micro-community fetcher 211 to decide which account references to associate with the micro-community. In another embodiment, when a user inputs a search query, the generated account references/micro-communities are presented to a user based on the rating scores. In another embodiment, a user rates the generated account references/micro-communities. The ratings server 221 stores these user ratings in memory 237 for future retrieval related to generating account references/micro-communities.

The notification module 219 is software including routines for transmitting a notification to a user. In one embodiment, the notification module 219 is a set of instructions executable by the processor 235 to generate a notification of an account reference list, an invitation to join a micro-community, a change in account references associated with the micro-community, a request to rate a micro-community, etc. In another embodiment, the notification module 219 is stored in memory 237 of the computing device 200 and is accessible and executable by the processor 235. In either embodiment, the notification module 219 is adapted for cooperation and communication with the processor 235, the micro-community fetcher 211, the ratings server 221, the account reference fetcher 207 and other components of the computing device 200 via signal line 228.

Account Reference/Micro-Community Fetcher 207/211

Figure 2B:
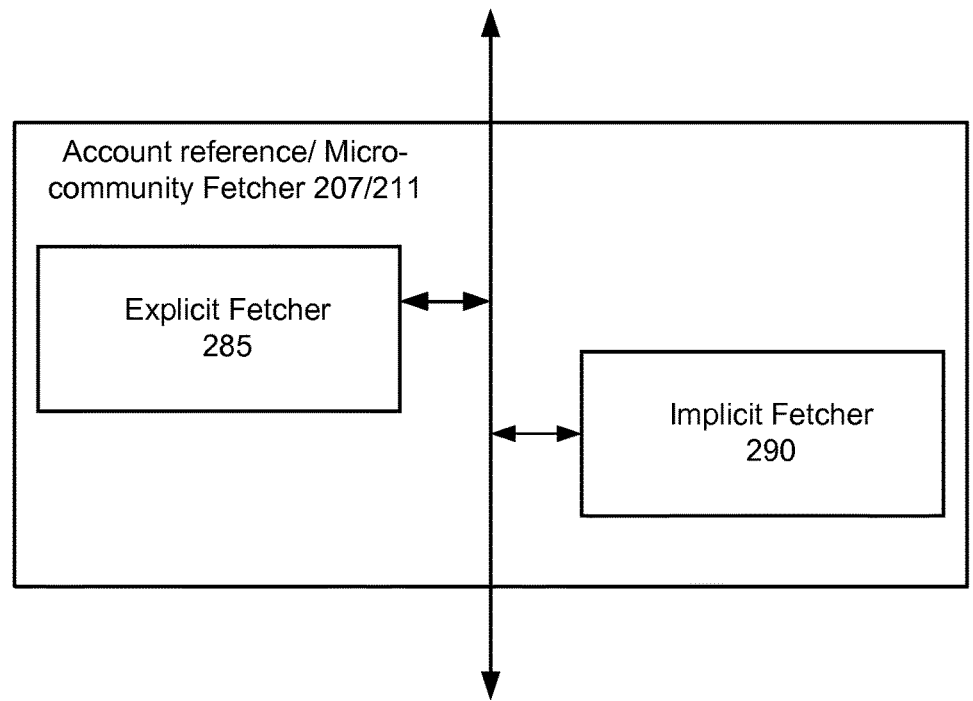
FIG. 2B is a block diagram illustrating one embodiment of an account fetcher or a micro-community fetcher.

FIG. 2B illustrates one embodiment of the account reference fetcher 207 and micro-community fetcher 211 in more detail. It should be noted that FIG. 2B is an exemplary embodiment, illustrating that the account reference fetcher 207 and micro-community fetcher 211 include the same software routines, but the account reference fetcher 207 retrieves account references and the micro-community fetcher 211 retrieves micro-communities. In another embodiment, the account reference fetcher 207 and the micro-community fetcher 211 contain software routines that are different from each other. For the purpose of this specification, FIG. 2B describes an account reference fetcher 207; however, persons of ordinary skill in the art recognize that this description applies to the micro-community fetcher 211 as well.

In one embodiment, the account reference fetcher 207 comprises an explicit fetcher 285 and an implicit fetcher 290. In another embodiment, the explicit fetcher 285 and the implicit fetcher 290 are separate account reference fetchers 207.

The explicit fetcher 285 is software including routines for retrieving account references. The explicit fetcher 285 retrieves account references of users that are explicitly relevant to the object reference. For example, the explicit fetcher 285 identifies invitees of a calendar entry, people who are approved to view a shared document, people who have checked into a specific bar using software that tracks a user's locations, online gamers playing for the same team, etc. In one embodiment, the explicit fetcher 285 is a set of instructions executable by the processor 235 to provide the functionality of retrieving account references that are explicitly relevant to the object reference. In another embodiment, the explicit fetcher 285 is stored in the memory 237 of the computing device 200 and is accessible and executable by the processor 235. In either embodiment, explicit fetcher 285 is adapted for cooperation and communication with the processor 235 and other components of the computing device 200 via bus 220.

In the case of a micro-community fetcher 211 that includes an explicit fetcher 285, the explicit fetcher 285 identifies account references that are explicitly relevant to the object reference. For example, where an object reference is an Artist X concert, the explicit fetcher 285 searches on a social network for a group that discusses the Artist X concert. If there is no group that discusses the Artist X concert or the Artist X, the explicit fetcher 285 generates a group on the social network and the notification module 219 invites people to the group.

The implicit fetcher 290 is software including routines for retrieving account references of users that are implicitly relevant to the object references and for receiving information about a user's interests and social connections (subject to the user opting into data collection). In one embodiment, the implicit fetcher 290 is a set of instructions executable by the processor 235 to provide the functionality described below for retrieving account references and receiving information. In another embodiment, the implicit fetcher 290 is stored in the memory 237 of the computing device 200 and is accessible and executable by the processor 235. In either embodiment, the implicit fetcher 290 is adapted for cooperation and communication with the processor 235 and other components of the computing device 200 via the bus 220.

The implicit fetcher 290 obtains information about users that opt-in to having data collected from user input and/or prior actions of a user across a range of heterogeneous data sources including search (such as web, video, news, maps, alerts), entertainment (such as news, video, a personalized homepage, blogs, a reader, gadget subscriptions), social activity (such as interactions through email, profile information, text messaging such as short message service (SMS), microblogging services, geographical locations, comments on photos, a social graph and other social networking information) and activity on third-party sites (such as websites that provide ratings, reviews and social networks where users indicate that they approve of content). This information is derived, for example, from a user's search history, browsing history and other interactions with the Internet.

The activities of the implicit fetcher 290 described herein are performed subject to user consent. In some implementations, a user is prompted to explicitly allow data collection. Further, the user may opt in/out of participating in such data collection activities. Furthermore, the collected data can be anonymized prior to performing the analysis to obtain the various statistical patterns described above.

In one embodiment, there are multiple implicit fetchers 290 such that each one receives data from a different heterogeneous data source. In another embodiment, the data is received by the same implicit fetcher 290. The implicit fetcher 290 transmits the received information to memory 237 for storage. In one embodiment, the memory 237 partitions the received information from each heterogeneous data source in a separate data storage location. In another embodiment, the data from heterogeneous data sources is stored in the same location in the memory 237.

In one embodiment, the implicit fetcher 290 functions as a recommendation engine and uses pattern recognition or any other matching technique to retrieve account references that are relevant to the object reference based on the implicit data received as mentioned above. The relevance of a user with an object reference is determined from both explicit information and inferred information. Explicit information is derived, for example, from a user's profile, a list of interests on a social network or indicating that they liked a particular news feed item. Inferred information takes into account a user's activities.

The implicit fetcher 290 infers that a user is interested in a particular object, for example, if the object matter appears in search terms. For example, the implicit fetcher 290 infers that a user who searches for information about different types of frogs is interested in frogs. If the user also searches for rafting equipment, the implicit fetcher 290 further infers that the user is interested in outdoor activities, such as rafting and camping. If the user subscribes to a blog about fashion, the implicit fetcher 290 infers that the user is interested in fashion. If the user clicks on Artist X articles in Google News, the implicit fetcher 290 infers that the user is interested in goth music. If the user repeatedly uses a mapping application to obtain directions to a barber, the implicit fetcher 290 infers that the user is interested in haircuts. If the user plays an online game using a gadget, the user is interested in playing games. If the user subscribes to a "Best of Baseball" YouTube channel, the implicit fetcher 290 infers that the user is interested in baseball. The implicit fetcher 290 can even infer information based on the user's friend's activities. For example, content items that interest the user's friends might also interest the user. As a result, in one embodiment, the implicit fetcher 290 includes the user's friends' interests to retrieve object references.

In another embodiment, the implicit fetcher 290 infers that a user is not interested in an object reference if the user rejected an invitation sent by the notification module 219 to join a micro-community related to the object reference. Thus, for future invitations the implicit fetcher 290 does not include the account reference as relevant to the object reference. In a similar embodiment, the implicit fetcher 290 makes inferences based on user ratings received by the ratings server 221.

Search Server 135

Figure 2C:
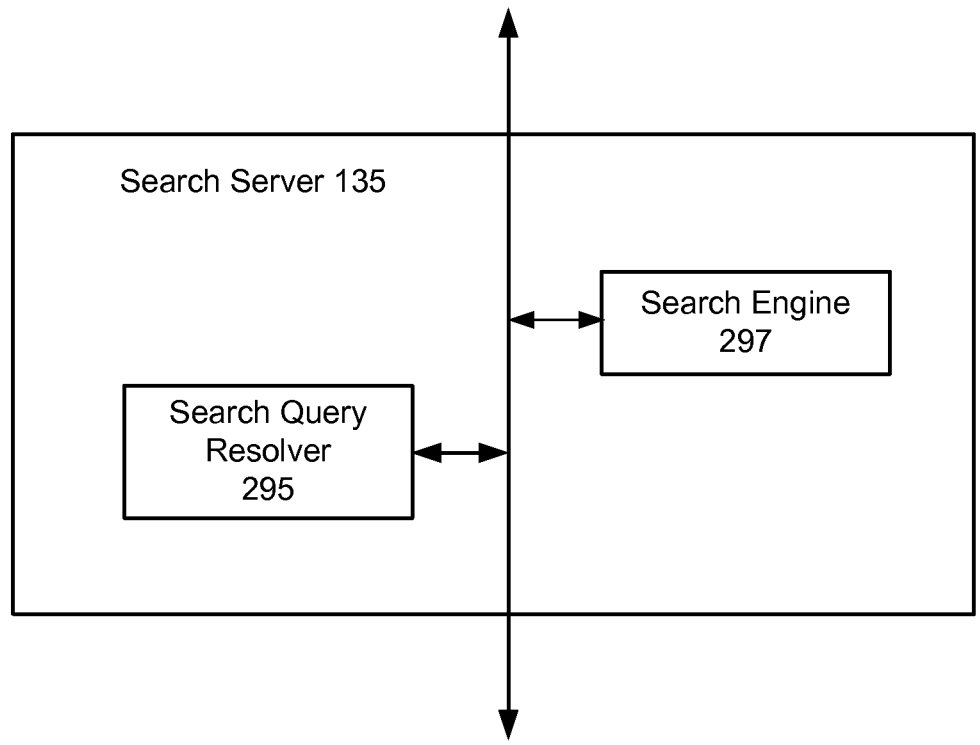
FIG. 2C is a block diagram illustrating one embodiment of a search server.

FIG. 2C illustrates one embodiment of a search server 135. The search server 135 includes a search query resolver 295 and a search engine 297. The search query resolver 295 receives search terms as open text or parameterized search terms from a user device 115a, a third-party server 107 or a social network server 101 and generates search terms in a format acceptable for the search engine 297. The search query resolver 295 transmits the search terms to the search engine 297, which performs a search and returns object references that are transmitted to the user device 115a, the third-party server 107 or the social network server 101. The microcommunity engine 103 receives the object references and generates a micro-community based on the object references.

For example, the search query resolver 295 receives "things to do with my friends tonight" from a user via a user device 115a. The search query resolver 295 identifies the user's location and the day of the week and generates a search query for the search engine 297, such as "'things to do' or activities or entertainment and Boston and Mar. 31, 2011." The search query resolver 295 transmits the search query to the search engine 297, which returns various object references including websites, place pages, map locations, etc. The search server 135 transmits the object references to the micro-community engine 103 on the third-party server 107, the social network server 101 or the user device 115, which generates a micro-community based on the object references. For example, the micro-community engine 103 generates a micro-community for different activities to be done on Mar. 31, 2011 in Boston and transmits invites to the user and the user's friends. The user and the user's friends then use the micro-community to discuss and decide on a group activity.

In another embodiment, the search query resolver 295 is stored as part of the micro-community engine 103. The search query resolver 295 either resolves the open text and parameterized search terms into simple object references or it communicates with the search engine 297 stored on the search server 135 via the network 105 to obtain object references.

Methods

Figure 3:
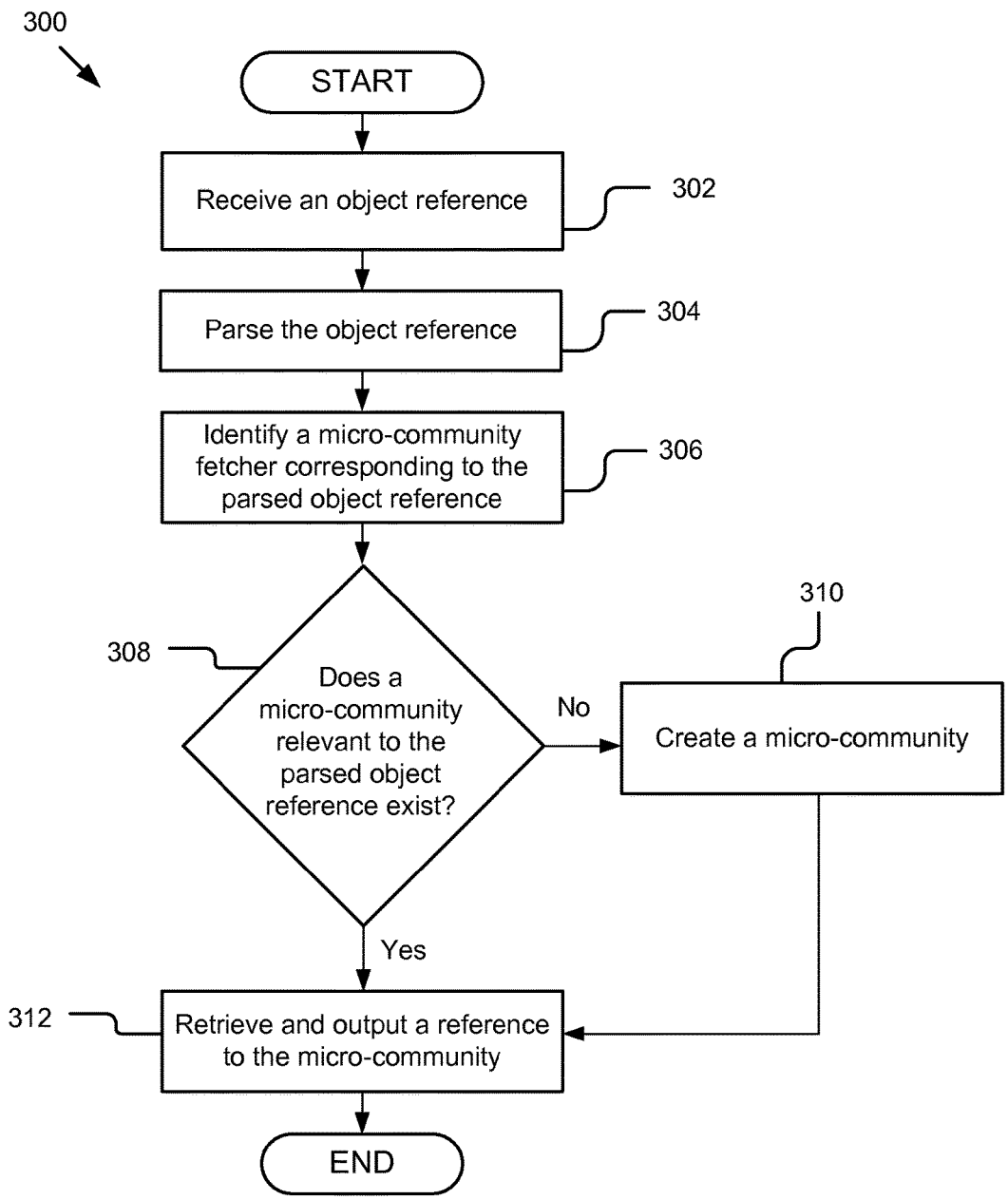
FIG. 3 is a flow diagram illustrating one embodiment for retrieving a micro-community relevant to an object reference.

Referring now to FIGS. 3-6, various example embodiments are described. FIG. 3 is a flow diagram 300 illustrating one embodiment for retrieving a micro-community relevant to an object reference. The object type parser 201 receives 302 an object reference, for example an indication that a new employee has been hired. The object type parser 201 parses 304 the object reference and ensures that it is a known object reference. For example, the object type parser 201 confirms that the new employee has a known employee identification number.

The micro-community type dispatcher 213 receives the parsed object type reference and identifies 306 a micro-community fetcher corresponding to the parsed object reference. The micro-community fetcher 211 is selected based on the desired type of micro-community.

The identified micro-community fetcher 211 determines 308 if a micro-community relevant to the parsed object reference exists. If at least one such micro-community already exists, the micro-community fetcher 211 identifies the relevant micro-communities. The relevant micro-communities include those that are explicitly relevant as determined by the explicit fetcher 285 and implicitly relevant as determined by the implicit fetcher 290. In this example, the explicit fetcher 285 identifies mailing lists and groups associated with the employee's position, office location, etc. The implicit fetcher 290 identifies the company's tennis community if the employee had listed racquet sports as one of his hobbies on his resume. The micro-community fetcher 211 then retrieves and outputs 312 a reference to the micro-community identified by the micro-community fetcher 211.

In the event that the micro-community fetcher 211 fails to identify existing micro-communities that are relevant to the object reference, the micro-community fetcher 211 creates 310 a new micro-community. In another embodiment, a user is given the option of providing additional input for the micro-community fetcher 211 to create a new micro-community if the user is not satisfied with the retrieved micro-communities.

Figure 4:
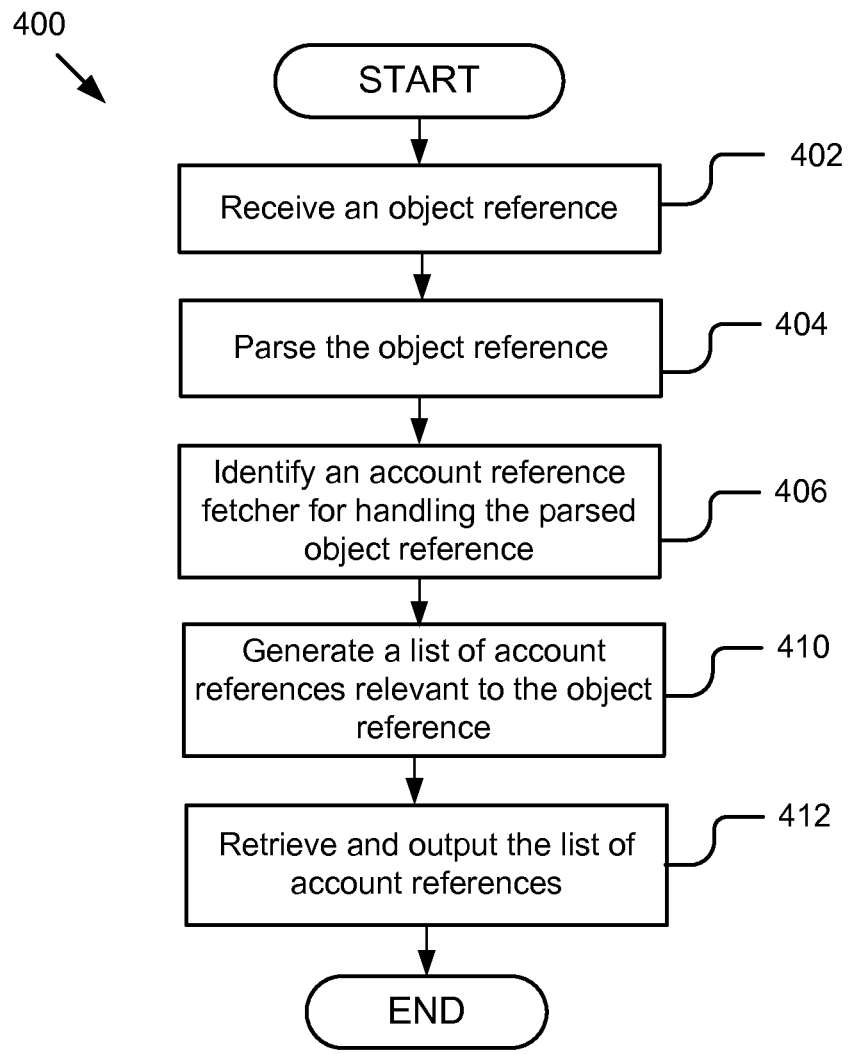
FIG. 4 is a flow diagram illustrating one embodiment of a method for generating a list of account references relevant to an object reference.

FIG. 4 is a flow diagram 400 illustrating one embodiment for generating a list of account references relevant to an object reference. The object type parser 201 receives 402 an object reference, for example, an invitation for a biomedical engineering conference to be held in Salt Lake City. The object type parser 201 parses 404 the object reference and transmits the object reference to the object type dispatcher 205. The object type dispatcher 205 identifies 406 the most appropriate account reference fetcher 207 to handle the parsed object reference based on the type of object reference. The account reference fetcher 211 identifies and generates 410 a list of account references or people that are relevant to the object reference. In this example, the account reference fetcher 211 identifies and generates a list of account references or people related to the conference. Specifically, the explicit fetcher 285 generates, for example, the list of people who have registered to attend and present a poster or a paper, guest speakers who need to be invited for the conference, etc. The implicit fetcher 290 of the account reference fetcher generates a list of biomedical device companies in and around Salt Lake City who might be interested in marketing their products or hiring biomedical engineers. The account reference fetcher 211 then retrieves and outputs 412 the list of account references. In another embodiment, the micro-community engine 200 can directly send an invitation for the conference to the listed accounts or people.

Figure 5:
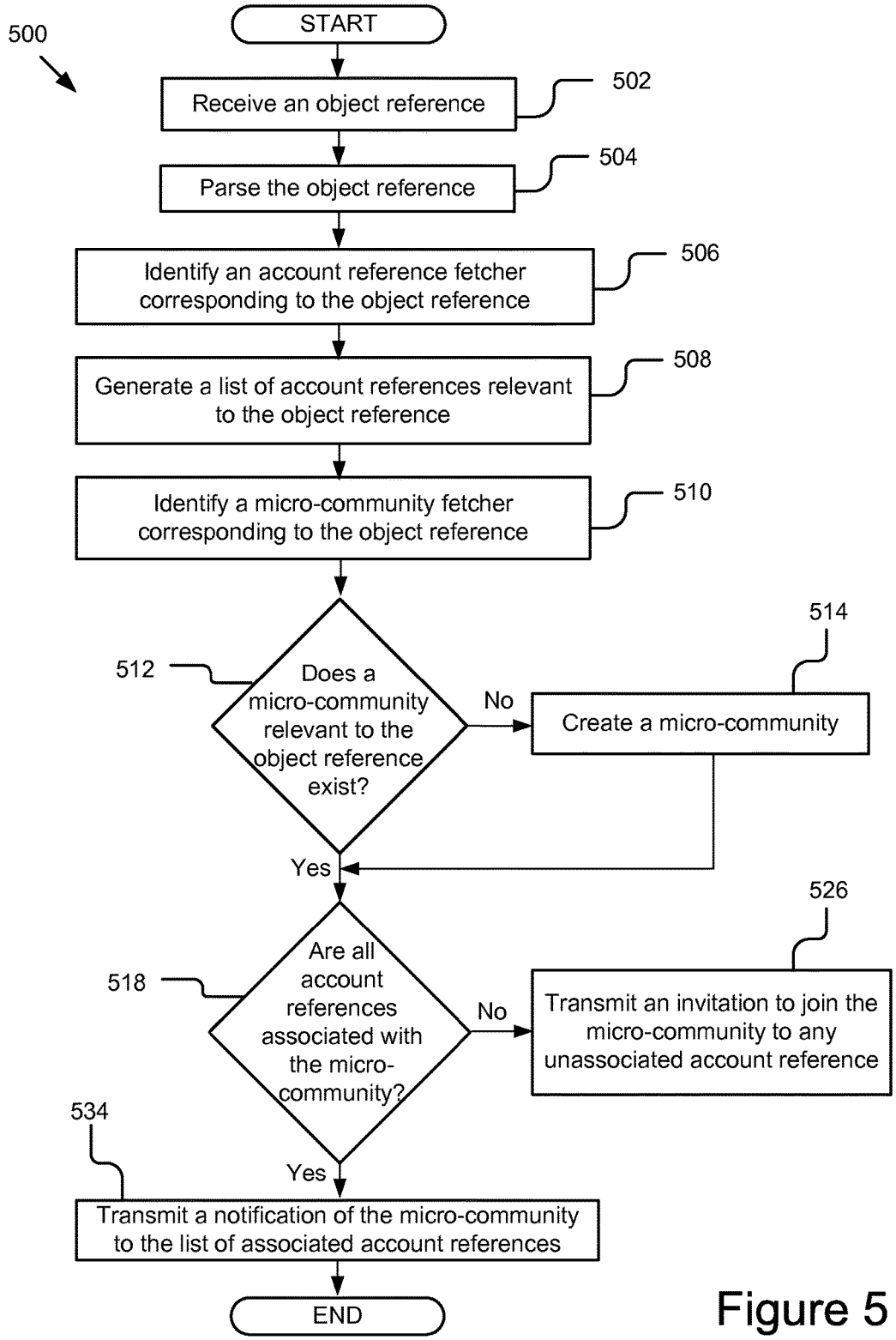
FIG. 5 is a flow diagram illustrating one embodiment of a method for generating a list of account references relevant to an object reference and associating them with a micro-community.

FIG. 5 is a flow diagram 500 illustrating one embodiment of a method for generating a list of account references relevant to an object reference and associating the list with a micro-community. The object type parser 201 receives 502 an object reference, for example, an indication that the user is currently at Band X's concert. The object type parser 201 parses 504 the object reference and transmits the object reference to the object type dispatcher 205. The object type dispatcher 205 identifies 506 an account reference fetcher 207 corresponding to the object reference as described in FIG. 4. The account reference fetcher 207 generates 508 a list of account references relevant to the object reference. Specifically, the explicit fetcher 285 of the account reference fetcher 207 identifies account references or people, for example, a friend who also happens to be present at the concert. The implicit fetcher 290 of the account reference fetcher 207 identifies other friends of the user who like Band X or listen to similar kind of music on YouTube, but are not present at the concert. In one embodiment, the notification module 219 transmits the account list to the requestor.

The account reference fetcher 207 transmits the account list to the micro-community type dispatcher 213. The object type parser 201 also transmits the object reference to the micro-community type dispatcher 213. The micro-community type dispatcher 213 identifies 510 a micro-community fetcher 211 corresponding to the object reference. The micro-community fetcher 211 determines 512 if there is at least one existing micro-community that is relevant to the received object reference and the list of account references. For example, the micro-community fetcher 211 searches a social network for groups or pages for Band X. In the event that the micro-community fetcher 211 fails to identify existing micro-communities that are relevant to the object reference, the micro-community engine creates 514 a new micro-community. For example, the micro-community fetcher 211 generates a group or a page about Band X.

If at least one micro-community that is relevant to the object reference and the list of account references exists, the micro-community fetcher 211 then determines 518 whether all the generated account references are associated with the micro-community. For example, some of the account references that are identified by the implicit fetcher 290 may not already be associated with the micro-community. If there is at least one account reference that is not associated with the micro-community, the notification module 219 transmits 526 an invitation to join the micro-community to the unassociated account reference. For the account references that are associated with the micro-community, the notification module 219 transmits a notification of the micro-community to the list of associated account references. The reference includes, for example, a list of unassociated account references that have been invited to join the micro-community. This way the current members can keep track of new members.

The users can then instantly use the micro-community to discuss the object reference with each other, share photos, videos, etc. The discussions and sharing can be made public or private depending on the configuration of the micro-community engine 130.

Figure 6:
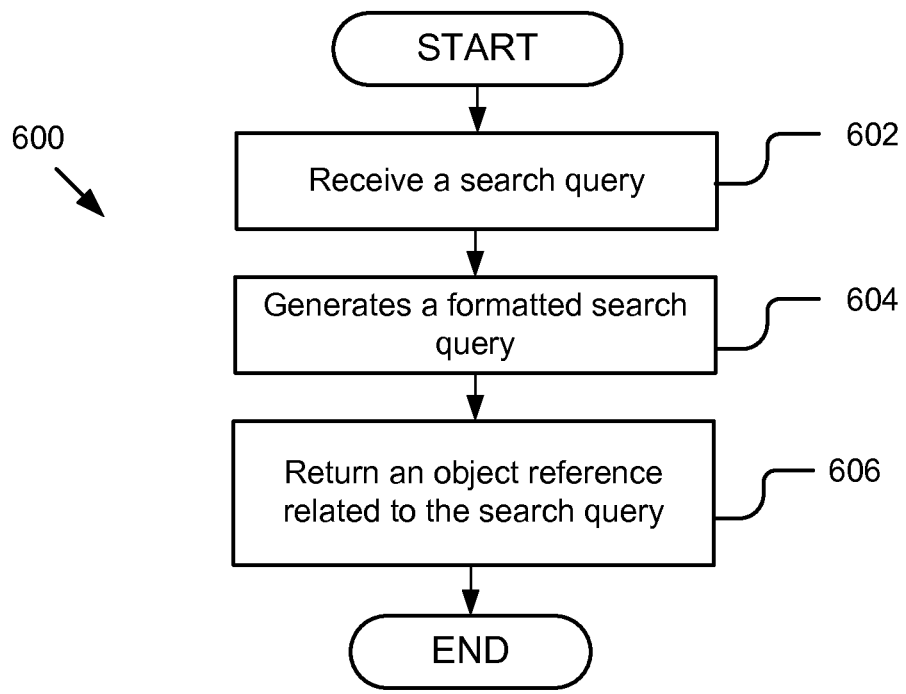
FIG. 6 is a flow diagram illustrating one embodiment of a method for searching for micro-communities and account references.

FIG. 6 is a flow diagram 600 illustrating one embodiment of a method for searching for micro-communities and account references. The search query resolver 295 receives 602 a search query from a user or from the object type parser 201. The search query is open text, parameterized search terms or any other search query format known to a person of ordinary skill in the art. The search query resolver 295 generates 604 a formatted search query in a format appropriate for the search engine 297. The search query resolver 295 transmits the formatted search query to the search engine 297. The search engine 297 returns 606 an object reference related to the search query. For example, the search engine 297 returns a list of web pages associated with the search query. The object references are transmitted to the micro-community engine 203 for starting the processes described in FIGS. 3-5.

The foregoing description of the embodiments has been presented for the purposes of illustration and description. It is not intended to be exhaustive or to limit the description to the precise form disclosed. Many modifications and variations are possible in light of the above teaching. It is intended that the scope of the description be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the description can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:

identifying, with one or more computing devices, an object reference from a user activity of a first user;

determining that a first account reference associated with a second user is implicitly relevant to the object reference based on activities of the second user on a social network and an interest in the object reference from another user connecting with the second user in the social network;

determining, with the one or more computing devices, a plurality of account references including the first account reference that are relevant to the object reference;

generating, with the one or more computing devices, a rating for each account reference in the list of account references based on relevance to the object reference;

determining, with the one or more computing devices, whether a micro-community relevant to the object reference exists;

responsive to determining that the micro-community does not exist, determining, with the one or more computing devices, a list of account references from the plurality of account references to associate with the micro-community, the list of account references including the first account reference associated with the second user that is implicitly relevant to the object reference;

generating, with the one or more computing devices, the micro-community for the list of account references;

determining, with the one or more computing devices, that the first account reference from the list of account references is unassociated with the micro-community;

transmitting an invitation to join the micro-community to the first account reference; and responsive to receiving a rejection of the invitation from the first account reference, determining that the first account reference is no longer relevant to the object reference and removing the first account reference from future invitations to join one or more micro-communities related to the object reference.

2. The computer-implemented method of claim 1, wherein the micro-community has a predetermined time duration, and wherein the micro-community ends when an event associated with a calendar entry occurs.

3. The computer-implemented method of claim 1, wherein the micro-community includes a feature of at least one of an email, a mailing list, an activity stream thread, a chat room, an audio conference call, a video conference call, a social arena, and a group supported by a third-party service.

4. The computer-implemented method of claim 1, wherein the object reference includes at least one from the group of a reference to a location, a reference to a calendar entry, a reference to a document, a reference to an image, a reference to a biometric key, a reference to a barcode, a reference to a newsfeed, a reference to a webpage, and a reference to a person.

5. The computer-implemented method of claim 1, wherein the plurality of account references include at least one of a reference to an email account, a reference to a social network account, an identity of at least one user, and an identity of a device.

6. The computer-implemented method of claim 1, further comprising:

determining, with the one or more computing devices, that a second account reference from the list of account references is unassociated with the micro-community; and transmitting, with the one or more computing devices, a second invitation to join the micro-community to the second account reference.

7. A computer program product comprising a non-transitory computer useable medium including a computer readable program, wherein the computer readable program when executed on a computer causers the computer to:

identify an object reference from a user activity of a first user;

determine that a first account reference associated with a second user is implicitly relevant to the object reference based on activities of the second user on a social network and an interest in the object reference from another user connecting with the second user in the social network;

determine a plurality of account references including the first account reference that are relevant to the object reference;

generate a rating for each account reference in the list of account references based on relevance to the object reference;

determine whether a micro-community relevant to the object reference exists;

responsive to determining that the micro-community does not exist, determine a list of 1account references from the plurality of account references to associate with the micro-community, the list of account references including the first account reference associated with the second user that is implicitly relevant to the object reference;

generate the micro-community for the list of account references;

determine that the first account reference from the list of account references is unassociated with the micro-community;

transmit an invitation to join the micro-community to the first account reference; and responsive to receiving a rejection of the invitation from the first account reference, determine that the first account reference is no longer relevant to the object reference and remove the first account reference from future invitations to join one or more micro-communities related to the object reference.

8. The computer program product of claim 7, wherein the micro-community has a predetermined time duration, and wherein the micro-community ends when an event associated with a calendar entry occurs.

9. The computer program product of claim 7, wherein the micro-community includes a feature of at least one of an email, a mailing list, an activity stream thread, a chat room, an audio conference call, a video conference call, a social arena, and a group supported by a third-party service.

10. The computer program product of claim 7, wherein the object reference includes at least one from the group of a reference to a location, a reference to a calendar entry, a reference to a document, a reference to an image, a reference to a biometric key, a reference to a barcode, a reference to a newsfeed, a reference to a webpage, and a reference to a person.

11. The computer program product of claim 7, wherein the plurality of account references include at least one of a reference to an email account, a reference to a social network account, an identity of at least one user, and an identity of a device.

12. The computer program product of claim 7, wherein the computer readable program when executed on the computer also causes the computer to:
   determine that a second account reference from the list of account references is unassociated with the micro-community; and
   transmit a second invitation to join the micro-community to the second account reference.

13. A system comprising:
   one or more processors; and
   a memory storing instructions that, when executed, cause the system to:
      identify an object reference from a user activity of a first user;
      determine that a first account reference associated with a second user is implicitly relevant to the object reference based on activities of the second user on a social network and an interest in the object reference from another user connecting with the second user in the social network;
      determine a plurality of account references including the first account reference that are relevant to the object reference;
      generate a rating for each account reference in the list of account references based on relevance to the object reference;
      determine whether a micro-community relevant to the object reference exists;
      responsive to determining that the micro-community does not exist, determine a list of account references from the plurality of account references to associate with the micro-community, the list of account references including the first account reference associated with the second user that is implicitly relevant to the object reference;
      generate the micro-community for the list of account references;
      determine that the first account reference from the list of account references is unassociated with the micro-community;
      transmit an invitation to join the micro-community to the first account reference; and
      responsive to receiving a rejection of the invitation from the first account reference, determine that the first account reference is no longer relevant to the object reference and remove the first account reference from future invitations to join one or more micro-communities related to the object reference.

14. The system of claim 13, wherein the micro-community has a predetermined time duration, and wherein the micro-community ends when an event associated with a calendar entry occurs.

15. The system of claim 13, wherein the micro-community includes a feature of at least one of an email, a mailing list, an activity stream thread, a chat room, an audio conference call, a video conference call, a social arena, and a group supported by a third-party service.

16. The system of claim 13, wherein the object reference includes at least one from the group of a reference to a location, a reference to a calendar entry, a reference to a document, a reference to an image, a reference to a biometric key, a reference to a barcode, a reference to a newsfeed, a reference to a webpage, and a reference to a person.

17. The system of claim 13, wherein the plurality of account references include at least one of a reference to an email account, a reference to a social network account, an identity of at least one user, and an identity of a device.

18. The system of claim 13, wherein the system is further configured to:
   determine that a second account reference from the list of account references is unassociated with the micro-community; and
   transmit a second invitation to join the micro-community to the second account reference.

* * * * *